(12) United States Patent
Wang et al.

(10) Patent No.: US 11,256,487 B2
(45) Date of Patent: Feb. 22, 2022

(54) VECTORIZED REPRESENTATION METHOD OF SOFTWARE SOURCE CODE

(71) Applicant: BEIHANG UNIVERSITY, Beijing (CN)

(72) Inventors: Xu Wang, Beijing (CN); Hailong Sun, Beijing (CN); Jian Zhang, Beijing (CN); Xudong Liu, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 17/059,320

(22) PCT Filed: Jan. 21, 2019

(86) PCT No.: PCT/CN2019/072463
§ 371 (c)(1),
(2) Date: Nov. 27, 2020

(87) PCT Pub. No.: WO2019/233112
PCT Pub. Date: Dec. 12, 2019

(65) Prior Publication Data
US 2021/0232376 A1    Jul. 29, 2021

(30) Foreign Application Priority Data
Jun. 5, 2018 (CN) .......................... 201810568286.1

(51) Int. Cl.
*G06F 8/41* (2018.01)
*G06N 3/10* (2006.01)

(52) U.S. Cl.
CPC ............... *G06F 8/427* (2013.01); *G06N 3/10* (2013.01)

(58) Field of Classification Search
CPC ........ G06F 16/285; G06F 8/433; G06F 8/427; G06F 16/22; G06N 3/10
See application file for complete search history.

(56) References Cited

U.S. PATENT DOCUMENTS 9,146,957 B2 *  9/2015  Wong ............... G06F 16/24526
10,581,888 B1 *  3/2020  Agranonik .......... H04L 63/1466
(Continued)

FOREIGN PATENT DOCUMENTS

| CN | 107169358 A | 9/2017 |
| CN | 107220180 A | 9/2017 |
| CN | 109101235   | 12/2018 |

OTHER PUBLICATIONS

BorisGalitsky, Machine learning of syntactic parse trees for search and classification of text, vol. 26, Issue 3, Mar. 2013, pp. 1072-1091 (Year: 2013).*

(Continued)

*Primary Examiner* — Anil Khatri
*Assistant Examiner* — Amir Soltanzadeh
(74) *Attorney, Agent, or Firm* — AKC Patents, LLC; Aliki K. Collins

(57) ABSTRACT

The invention provides a vectorized representation method of a software source code. The vectorized representation method is an AST-based neural network which is a hierarchical vector representation method comprising the following implementation steps: step 1-1, converting an original software source code into an AST at the lowest layer, and then further dividing the AST according to source code statements to acquire a smaller statement tree sequence, wherein statement trees in the statement tree sequence are different in sequence, and the statement tree sequence is consistent with an original statement sequence; step 1-2, encoding the statement trees into statement vectors $e_1$, $e_2$, ..., $e_t$ by a recursive neural encoder; step 1-3, enabling an acquired statement vector sequence to pass through a bidirectional recurrent neural network layer to extract dependency features between statements; and step 1-4, sampling multi-dimensional features of all time steps of the (Continued)

bidirectional recurrent neural network layer through a pooling layer to acquire a final vector representation.

4 Claims, 1 Drawing Sheet

(56) References Cited

U.S. PATENT DOCUMENTS

| | | | |
|---|---|---|---|
| 10,685,284 B2* | 6/2020 | Smyth | G06N 3/04 |
| 2011/0035398 A1* | 2/2011 | Lee | G06F 16/81 |
| | | | 707/760 |
| 2014/0331203 A1 | 11/2014 | Elshishiny et al. | |
| 2017/0212829 A1* | 7/2017 | Bales | G06F 11/3612 |
| 2018/0075349 A1* | 3/2018 | Zhao | G06N 3/084 |
| 2018/0181860 A1* | 6/2018 | Verbist | G06N 3/0454 |
| 2018/0373507 A1* | 12/2018 | Mizrahi | G06F 8/36 |

OTHER PUBLICATIONS

ISR for PCT/CN2019/072463, Apr. 18, 2019.

* cited by examiner

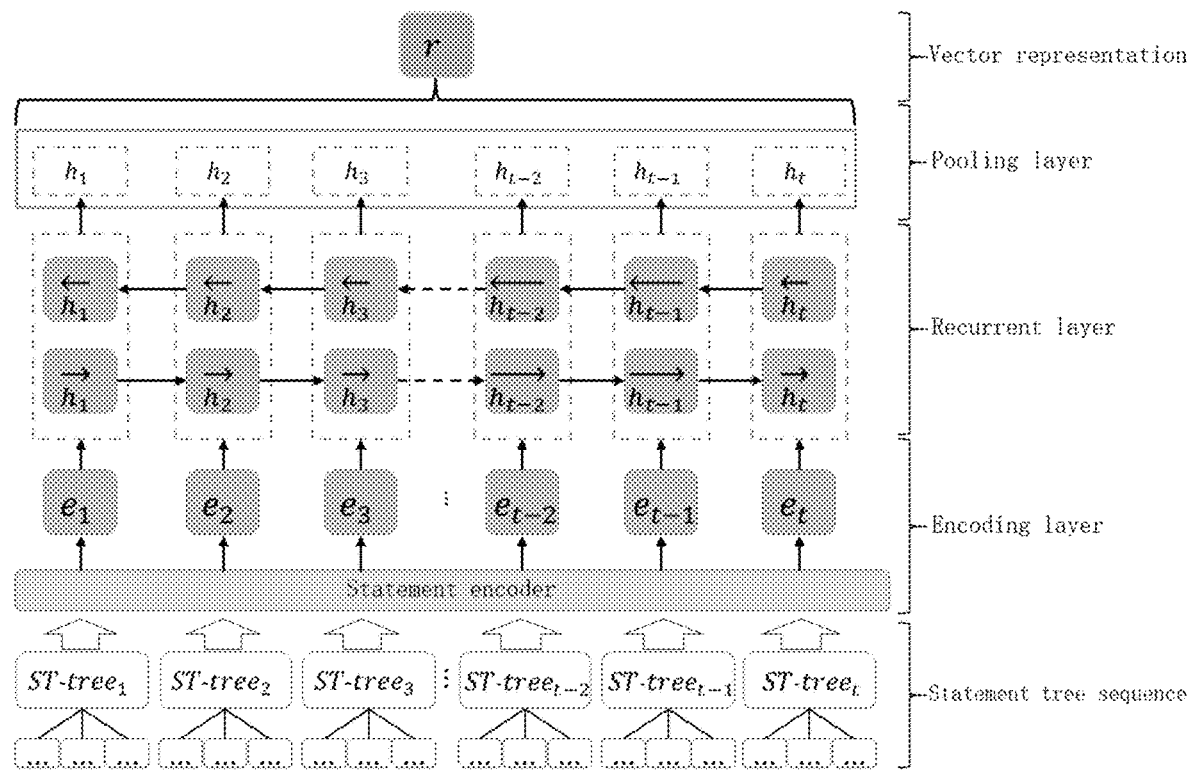

VECTORIZED REPRESENTATION METHOD OF SOFTWARE SOURCE CODE

FIELD

The present invention relates to a vectorized representation method and particularly relates to a vectorized representation method of a software source code.

BACKGROUND

Program comprehension plays a crucial role in many software engineering applications, can help developers improve development efficiency and code quality on the one hand, and also help software maintenance on the other hand. Typical applications include code classification, code clone detection, defect prediction, and code summary generation, wherein the important and difficult part for achieving program comprehensive is how to establish an effective program representation method to capture as much as possible the semantics of the program itself, such as the function of a program.

Although we can manually design or extract program features to realize many relevant applications, the disadvantage of this method is that significant labor is required and features acquired are often limited to specific tasks. Therefore, the prior art often directly uses some conventional methods in information retrieval to extract the features in the program. For example, a program is regarded as a set or sequence of words to realize clone detection of the code. In addition, topic models such as latent semantic indexing (LSI) or latent Dirichlet allocation (LDA) are also widely used in program analysis and processing. However, the common problem of these applications is to treat the code as a natural language and apply methods in natural language processing (NLP). In fact, the code contains abundant structural information, which cannot be captured by the above methods.

According to the latest technology, parsing tools are used to convert a program source code into an abstract syntax tree (AST) to structurally represent the program. On this basis, a neural network method is combined to automatically acquire a vector representation of the program for different tasks and scenarios. For example, after the AST of a certain program is acquired, a recursive neural network is directly used to perform bottom-up recursive encoding on the entire syntax tree to acquire a final semantic vector. Similarly, existing research also combines tree-based convolutional neural network (CNN) or long short term memory (LSTM) to enhance the representation capability of structural information. But these methods still have three main problems as follows:

1, the scale of the entire AST is large, and the tree-structured neural network easily causes the problem of gradient vanishing;

2, the method of traversing the entire AST from the bottom up or by using a sliding window tends to lose long-distance dependence information contained in the original program; and 3, most of the existing tree-based neural network methods convert the original AST to be in a form of a binary tree, which destroys the original structural information and semantic information, causes a large increase in the depth of the tree, and further results in the difficulty of capturing long-distance dependence.

SUMMARY

With regard to the problems existing in the prior art, the present invention provides a vectorized representation method of a software source code. The vectorized representation method is an AST-based neural network. First, for an acquired AST, the AST is divided into a series of statement trees and an original statement sequence is maintained, rather than encoding and calculating the entire tree structure. Each statement tree (ST-tree) corresponds to a certain program statement in a source code. Second, the statement trees generally have a multi-branch structure, and a statement encoder composed of a recursive neural network is used to encode each statement tree to acquire a statement vector. At the same time, a dynamic batch calculation algorithm is used to avoid destroying the original multi-way tree structure information. Finally, after such statement vector sequence is acquired, a bidirectional recurrent neural network (RNN) is used to capture the context dependency between statements, and a final software source code vector is acquired through sampling by a pooling layer. Through end-to-end training, learned vectors can better solve different software analysis and program comprehensive tasks.

BRIEF DESCRIPTION OF THE DRAWINGS

FIG. 1 is an overall architecture diagram of an AST-based neural network of the present invention.

DETAILED DESCRIPTION OF THE EMBODIMENTS

In order to make the objectives, technical solutions and advantages of the present invention more apparent, the present invention will be described in further detail below with reference to the accompanying drawing and embodiments. It should be understood that the specific embodiments described herein are only used to explain the present invention, rather than limiting the present invention. In addition, the technical features involved in the various embodiments of the present invention described below can be combined with each other as long as they do not conflict with each other.

FIG. 1 shows the overall architecture of an AST-based neural network of the present invention. A neural network structure of the present invention is a hierarchical vector representation method. The method comprises the following steps:

step 1, converting an original program into an AST at the lowest layer and then further dividing the AST to acquire a corresponding statement tree sequence, wherein statement trees in the statement tree sequence are different in sequence, and the statement tree sequence is consistent with an original statement sequence;

step 2, encoding the statement trees into statement vectors $e_1, e_2, \ldots, e_t$ by a recursive statement encoder, wherein t is a positive integer;

step 3, enabling the acquired vector sequence to pass through a bidirectional recurrent layer to extract dependence features between statements; and step 4, sampling multi-dimensional features of all time steps through a pooling layer to acquire a final single vector representation to express the semantic information of the program.

After a software source code is converted into the AST, firstly, an identifier sequence of the tree is acquired in a preorder traversing manner, and an existing word embedding technology (such as Word2Vec) is utilized to convert each identifier to be in a vector form to facilitate encoding of an upper layer. Subsequently, the original AST is divided into a statement tree sequence. The method includes two parts: a traverser and a constructor.

In this method, the traverser is used to perform depth-first traversing on the original AST, and the constructor follows the rules to construct a syntax tree corresponding to each statement. Specific steps are as follows: a root node of an AST of a certain program is input, when a certain element accessed by the traverser is a header of a compound statement, such as a function definition or control statements, the constructor is called to construct a form of a tree, which does not contain a nested statement element, of the header of the statement. If the currently accessed element is a body of the compound statement, the traverser (compound statement) is recursively called for all statements in the body or the statement trees (non-compound statement) are constructed. Finally, all the constructed statement trees are stored in a global ordered set according to the original statement sequence, that is, the statement tree sequence.

Each statement tree acquired above is in a form of a multi-way tree, and each node of the tree is an identifier. For a given statement tree t, n represents a certain parent node, C represents a set of all child nodes of the parent node, and the specific encoding steps are as follows:

step 1: acquiring a word vector of the node according to a formula $v_n = W_e x_n$, wherein $W_e$ is a pre-trained weight acquired by a word vector training method Word2vec, and $x_n$ is a one-hot vector representation of the node;

step 2: performing combinatorial calculation on the vector representation of the node n and vector representations of all child nodes of the node n, $$h = \sigma(W_n v_n + \Sigma_{i \in C} h_i + b_n),$$

wherein $W_n$ is a weight matrix, $b_n$ is a bias term, $h_i$ is the vector representation of a certain child node, and $\sigma$ is an activation function, such as a tan h function or an identity function;

step 3: after recursive calculation, enabling each node to have its vector representation, wherein feature sampling is performed on N nodes in the statement tree by pooling to acquire the vector representation $e_t$ of the statement, and the calculation manner is as follows:

$e_t = [\max(h_{i1}), \ldots, \max(h_{ik})]$, $i \in [1, N]$, wherein k represents k elements of the vector, and i is the index of the N nodes.

Generally speaking, since each statement tree is in the form of the multi-way tree, and the structure thereof is changeable, so that it is difficult to perform batch calculation. In order to improve the calculation efficiency, the present invention designs a dynamic batch calculation method. The specific implementation of the method is described below. In this method, L statement trees are calculated in batches, and the calculation starts from a root node of each statement tree in a depth-first manner. Firstly, matrix multiplication is utilized to calculate all word vectors of all current nodes in batches according to the step 1, then whether each node has child nodes is checked and iterative update is performed according to an index to which each node belongs. The update manner is shown in the FIGURE below,

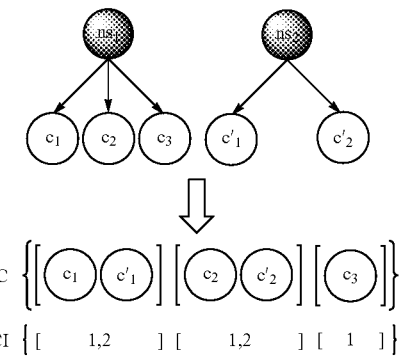

The nodes processed in the current batch are gray nodes. After child nodes of the nodes are checked, the child nodes are divided into multiple batches of new nodes and indexes thereof are recorded to perform iterative batch calculation. After vectors of the child nodes are recursively calculated in batches, the hidden state of the vectors is updated according to the formula in the step 2. All nodes represented by the vectors are placed into a global tensor. Finally, the tensor is pooled to acquire the final vector representation of each statement tree.

In the recurrent layer, a bidirectional gated recurrent unit (GRU) is used to characterize the dependence information between code blocks. It is assumed that there are T code blocks in one sequence, an expression form is $[e_1, \ldots, e_t]$, $t \in [1, T]$. At moment t, the vector calculation method of its hidden state is as follows:

$$r_t = \sigma(W_r e_t + U_r h_{t-1} + b_r),$$

$$z_t = \sigma(W_z e_t + U_z h_{t-1} + b_z),$$

$$\tilde{h}_t = \tan h(W_h e_t + r_t \odot (U_h h_{t-1}) + b_h),$$

$$h_t = (1 - z_t) \odot h_{t-1} + z_t \odot \tilde{h}_t,$$

wherein $r_t$ represents a reset gate, and is used to control the impact of a previous state on a current state; $z_t$ represents an update gate, and is used to combine a historical state with the current state; and $\tilde{h}_t$ represents a candidate state, and is used for linear combinatorial calculation with the historical state and a current updated state to determine a final current state $h_t$. Herein, all W and U are weight matrices, and b is a corresponding bias term, and $\sigma$ is a sigmoid activation function. After iterative calculation, forward dependence information is automatically acquired. In addition, a backward GRU is used, and a calculation formula of the backward GRU is consistent with that of a forward GRU. The difference is that the calculation sequence is reversed, that is, a start position is the vector of the last code block, and an end position is the vector of the first code block. Moreover, hidden states calculated in the two directions are connected to form a state at a certain moment. This process is expressed by the following formula:

$$\vec{h}_t = \overrightarrow{GRU}(e_t), t \in [1, T]$$
$$\overleftarrow{h}_t = \overleftarrow{GRU}(e_t), t \in [T, 1]$$
$$h_t = [\vec{h}_t, \overleftarrow{h}_t], t \in [1, T]$$

Finally, maximum pooling or average pooling is used to sample the hidden state at each moment to acquire the vector representation r of the entire program.

The vector representation method of the software source code provided in the solution can be used for training and prediction of different tasks, such as code classification tasks and code clone detection.

For code classification, it is assumed that there are M categories, first, mapping with the M categories is acquired according to $\hat{x}=W_o r$, wherein $W_o$ is a weight matrix. Then, a loss function can be defined cross entropy:

$$J(\Theta, \hat{x}, y) = \Sigma_i \left( -\log \frac{\exp(\hat{x}_{iy})}{\Sigma_j \exp(\hat{x}_{ij})} \right),$$

wherein $\Theta$ represents all weight parameters to be optimized in a model, y represents a real category, i represents an index number of a sample, and j represents a category number.

For code clone detection, $r_1$ and $r_2$ are used to represent vectors of two programs respectively, then, $|r_1-r_2|$ is used to measure the similarity between the vectors, afterwards, $\hat{x}$ is acquired by the same method, then $\hat{y}$=sigmoid( ), and therefore, the loss function is defined as:

$$J(\Theta, \hat{y}, y) = \Sigma_i(y_i \log(\hat{y}_i) + (1-y_i)\log(1-\hat{y}_i))).$$

The above model is trained to optimize its loss function, so that the loss function is minimized. Existing optimizers, such as AdaMax, can be used.

After the trained model is acquired, the model can be used to predict different tasks. For code classification, a predicted value p represents a probability corresponding to a plurality of tags. The category corresponding to the maximum probability is taken, such as $$\text{prediction} = {}_i^{\text{argmax}}(p_i),$$
$$i = 1, \ldots, M.$$

Similarly, for code clone detection, p is a real number in a range [0,1]. According to a threshold, the result can be judged, that is, if p is greater than $\delta$, it is considered a clone, otherwise it is not considered a clone.

Finally, it should be noted that the above embodiments are only used to illustrate the technical solutions of the present invention, rather than limiting the present invention. Although the present invention has been described in detail with reference to the above embodiments, those of ordinary skill in the art should understand that modifications can be performed on the technical solutions recorded in the above embodiments, or equivalent replacements can be performed on some of the technical features thereof as long as these modifications or replacements do not make the essence of the corresponding technical solutions deviate from the spirit and scope of the technical solutions of the embodiments of the present invention.

The invention claimed is:

1. A vectorized representation method of a software source code, characterized by being an abstract syntax tree (AST)-based neural network which is a hierarchical vector representation method comprising the following implementation steps:

step 1-1, converting an original software source code into an abstract syntax tree (AST) at a lowest layer, and then further dividing the AST according to source code statements to acquire a smaller statement tree sequence, wherein statement trees in the statement tree sequence are different in sequence, and the statement tree sequence is consistent with an original statement sequence;

step 1-2, encoding the statement trees into statement vectors $e_1, e_2 \ldots, e_t$ by a recursive neural encoder;

step 1-3, enabling an acquired statement vector sequence to pass through a bidirectional recurrent neural network layer to extract dependence features between statements; and step 1-4, sampling multi-dimensional features of all time steps of the bidirectional recurrent neural network layer through a pooling layer to acquire a final vector representation; and wherein after a program is converted into an AST, firstly, an identifier sequence of the AST is acquired in a preorder traversing manner, and each identifier is converted to be in a vector form by using an existing word embedding technology, and then the AST is divided into a statement tree sequence; and a method for dividing the AST into the statement tree sequence is as follows: inputting a root node of an AST of a certain program, when a certain element accessed by a traverser is a header of a compound statement, and the header comprises function definition, and control statements, calling a constructor to construct a form of a tree, which does not contain nested statement elements, of the header statement, that is, a statement tree of the compound statement; if a currently accessed element is a body of the compound statement, recursively calling the traverser for all statements contained in the body, or constructing subtrees corresponding to the statements as statement trees; and finally, storing the constructed statement trees in a global ordered set according to the statement sequence of the original software source code, that is, the statement tree sequence.

2. The method according to claim 1, characterized in that a method for encoding the statement trees is that for a given statement tree t, n represents a certain parent node, and C represents a set of child nodes of the parent node, and comprises the following encoding steps:

step 3-1: acquiring a word vector of the node according to a formula $$v_n = W_e x_n,$$

Wherein $W_e$ is a pre-trained weight acquired by a word vector training method, and $x_n$ is a one-hot vector representation of the node;

step 3-2: performing combinatorial calculation on the vector representation of the node n and vector representations of all child nodes of the node n, $$h = \sigma(W_n v_n + \Sigma_{i \in C} h_i + b_n),$$

wherein $W_n$ is a weight matrix, $b_n$ is a bias term, $h_i$ is the vector representations of the child nodes, and $\sigma$ is an activation function; and step 3-3: performing recursive calculation to make each node have a vector representation, and for N nodes in the statement trees, performing feature sampling on the N nodes by pooling to acquire a vector representation $e_t$ of the statement, wherein a calculation manner for feature sampling is as follows:

$$e_t = [\max(h_{i1}), \ldots, \max(h_{ik})], i \in [1, N]$$

wherein k represents k elements, and i is an index of the N nodes.

3. The method according to claim 2, characterized by comprising a batch calculation method for multi-branch statement trees since the statement trees may be multi-way trees, wherein the batch calculation method calculates a plurality of statement trees in batches, performs calculation from a root node of each statement tree in a depth-first manner, and comprises: calculating all word vectors of all nodes in batches according to the step 3-1 by a matrix multiplication method, then checking whether each node has child nodes and performing iterative updating according to an index to which each node belongs, recursively calculating vectors of the child nodes in batches, afterwards, updating hidden states of the vectors according to the step 3-2, placing all the nodes represented by the vectors into a global tensor, and finally, pooling the tensor to acquire the vector representation of each statement tree, that is, the corresponding statement vectors.

4. The method according to claim 1, characterized in that a method for the step of extracting dependence features between statements is that an expression form is $[e_1 \ldots e_t], t \in [1, T]$ wherein T is a number of statements in one sequence, t is a positive integer, and at moment t, a vector calculation manner of a hidden state is:

$r_t = \sigma(W_r e_t + U_r h_{t-1} + b_r)$, $z_t = \sigma(W_z e_t + U_z h_{t-1} + b_z)$, $\tilde{h}_t = \tan h(W_h e_t + r_t \odot (U_h h_{t-1}) + b_h)$, $h_t = (1-z_t) \odot h_{t-1} + z_t \odot \tilde{h}_t$, Wherein $r_t$ represents a reset gate, and is used to control the impact of a previous state on a current state, $z_t$ represents an update gate, and is used to combine a historical state with the current state, $\tilde{h_t}$ represents a candidate state, and is used for linear combinatorial calculation with the historical state and a current updated state to determine a final current state $h_t$; W and U are weight matrices, b is a corresponding bias term, and $\sigma$ is an activation function; after iterative calculation, forward dependence information is automatically acquired; in addition, a backward gated recurrent unit (GRU) is used, hidden states calculated in two directions are connected to form a state at a certain moment; this process is expressed by the following formula:

$\overrightarrow{h_t} = \overrightarrow{GRU}(e_t), t \in [1, T]$ $\overleftarrow{h_t} = \overleftarrow{GRU}(e_t), t \in [T, 1]$ $h_t = [\overrightarrow{h_t}, \overleftarrow{h_t}], t \in [1, T]$;

and finally, the hidden state at each moment is sampled by maximum pooling or average pooling to acquire a vector representation r of the entire software source code.

* * * * *